United States Patent
Koch (10) Patent No.: US 8,675,380 B2
(45) Date of Patent: Mar. 18, 2014

(54) POWER SUPPLY UNIT WITH A HOUSING AND A SWITCHED POWER SUPPLY ARRANGED IN THE HOUSING

(75) Inventor: Walter Koch, Schwanberg (AT)

(73) Assignee: LOGICDATA Electronic & Software Entwicklungs GmbH, Deutschlandberg (AT)

( * ) Notice: Subject to any disclaimer, the term of this patent is extended or adjusted under 35 U.S.C. 154(b) by 261 days.

(21) Appl. No.: 13/123,474

(22) PCT Filed: Oct. 6, 2009

(86) PCT No.: PCT/EP2009/062971
§ 371 (c)(1),
(2), (4) Date: Apr. 8, 2011

(87) PCT Pub. No.: WO2010/040745
PCT Pub. Date: Apr. 15, 2010

(65) Prior Publication Data
US 2011/0228576 A1    Sep. 22, 2011

(30) Foreign Application Priority Data
Oct. 10, 2008    (DE) .......................... 10 2008 051 247

(51) Int. Cl.
*H02M 3/18*    (2006.01)
*H02M 7/00*    (2006.01)
*H02M 7/04*    (2006.01)
*H02M 1/00*    (2007.01)
*H05K 7/00*    (2006.01)

(52) U.S. Cl.
USPC .............. 363/146; 363/61; 363/143; 361/781

(58) Field of Classification Search
USPC .............................. 363/61, 143, 146; 361/781
See application file for complete search history.

(56) References Cited

U.S. PATENT DOCUMENTS

| | | | |
|---|---|---|---|
| 4,128,867 A | | 12/1978 | Heyman |
| 4,665,323 A | * | 5/1987 | Russell et al. ................... 307/75 |
| 4,845,607 A | | 7/1989 | Nakao et al. |
| 4,937,731 A | * | 6/1990 | Konopka ....................... 363/143 |
| 5,684,689 A | | 11/1997 | Hahn |
| 5,973,948 A | * | 10/1999 | Hahn et al. ..................... 363/146 |
| 6,286,441 B1 | | 9/2001 | Burdi et al. |
| 2002/0154528 A1 | * | 10/2002 | Ravid ............................ 363/146 |
| 2003/0043607 A1 | * | 3/2003 | Vinciarelli et al. ............. 363/61 |
| 2003/0117094 A1 | * | 6/2003 | Bastholm ........................ 318/34 |
| 2009/0185403 A1 | * | 7/2009 | Koch ............................. 363/126 |

FOREIGN PATENT DOCUMENTS

| | | |
|---|---|---|
| DE | 27 46 504 A1 | 4/1978 |
| DE | 103 43 925 A1 | 4/2005 |
| WO | WO 2007/087652 A2 | 4/1978 |
| WO | WO 98/08294 | 2/1998 |

* cited by examiner

Primary Examiner — Adolf Berhane
Assistant Examiner — Gary Nash
(74) Attorney, Agent, or Firm — Slater & Matsil, L.L.P.

(57) ABSTRACT

The invention relates to a mains plug component with a housing and a mains switch component arranged in the housing comprising a first stage for rectifying a mains AC voltage and a second stage for generating a DC voltage from the rectified mains AC voltage. The first stage comprises an electromechanical switch, by means of which a first or second voltage range may be selected. The housing has a section for a pin of an inserted plug piece such that, on insertion, the switch is activated by the inserted pin. The plug piece for insertion has no pin for the first voltage range and a pin for the second voltage range.

17 Claims, 3 Drawing Sheets

Front View

POWER SUPPLY UNIT WITH A HOUSING AND A SWITCHED POWER SUPPLY ARRANGED IN THE HOUSING

This patent application is a national phase filing under section 371 of PCT/EP2009/062971, filed Oct. 6, 2009, which claims the priority of German patent application 10 2008 051 247.8, filed Oct. 10, 2008, each of which is incorporated herein by reference in its entirety.

TECHNICAL FIELD

The invention concerns a plug type power supply unit with a switchable power supply component that is suitable for supplying voltage to an electrically adjustable item of furniture or other electrical consumer in an item of furniture.

BACKGROUND

Electrically adjustable items of furniture are increasingly being offered. Thus, in the case of many tables, especially writing tables, the height of the table itself can be electrically adjusted by a special drive. Beds, too, for example luxury beds or hospital beds, can be adjusted somewhat in height or angle via electrical drives. However, other electrical consumers are increasingly being found in furniture, for example a heating mat or vibrating motors in beds or luxury armchairs.

In the case of electrically adjustable furniture it is possible to use DC motors that can be operated with low voltage for the drive of the electrical adjusting device. For this the line voltage is stepped down, for example, by means of a transformer, to the lower voltage range of the DC motors and converted to DC voltage via a rectifier circuit. Control of the DC motors can take place by a controlled connection of the motors to the DC voltage thus generated. Alternatively, control can also be provided with a DC voltage that corresponds to the lower voltage range of the motors via a switchable power supply.

For example, a switchable power supply can be incorporated in a plug type power supply unit. Since the same AC line voltage is not used in all areas of the world, it may be necessary to make available different switchable power supplies for different line voltages. For instance, in most of Europe a line voltage of about 230 volts is available, while in North America the line voltage is about 110 volts. So that a switchable power supply can be used in both voltage regions, it is possible to provide an electronic detection circuit that recognizes the voltage range that is present in each case and switches the switchable power supply to an appropriate operating mode. However, such a detection circuit increases the production cost and thus the costs of the switchable power supply component.

Furthermore, a specific voltage range in which the switchable power supply is operated can be chosen by means of a manual switch. However, if there is erroneous operation of the manual switch or erroneous choice of the voltage range, this can lead to damage or destruction of the switchable power supply.

SUMMARY OF THE INVENTION

Embodiments of the invention disclose a cheap plug type power supply unit with a switchable power supply component that enables use in different AC line voltage areas.

In an exemplary embodiment of a plug type power supply unit with a housing and a switchable power supply arranged in the housing, the switchable power supply comprises a first stage, which is set up for rectification of an AC line voltage, and a second stage, which is set up to output at least one DC voltage that is generated from the rectified AC line voltage. In the first stage there is a switch via which a first line voltage range or a second line voltage range can be selected. The housing has a receptacle for a plug unit. The AC line voltage in this case is sent to the first stage via the plug unit that is inserted in the receptacle in each case.

The switch of the first stage is designed as an electromechanical or electronic switch and the plug unit has means for actuating the switch, which can be triggered in dependence on the plug unit that is inserted in each case.

Thus, different plug units that are appropriate for insertion into the appropriate wall sockets are made available for the plug type power supply unit, where usually there is a direct connection between the line voltage range that is used and the plug or socket type, assuming a proper electrical installation. Accordingly, the plug units can be designed so that, depending on the relevant line voltage, the switch in the first stage of the switchable power supply will or will not be actuated. In other words, the first or the second line voltage range is chosen in the first stage in dependence on the plug unit that is inserted in each case.

Through the use of a simple electromechanical or electronic switch that switches directly between the first and second voltage range, the switchable power supply or the plug type power supply unit can be made with low cost switching technology and thus cheaply. Moreover, through the given dependence of the plug unit that is used in each case on the line voltage range, it is ensured that the switchable power supply will operate in the correct line voltage range.

For example, the receptacle has a hole that is suitable for receiving a pin of an inserted plug unit so that the switch is actuated by the inserted pin. In this case, for example, a plug unit for the first voltage range does not have such a pin, so that the switch is not actuated. A plug unit for the second voltage range on the other hand has the pin, which actuates the switch and thus switches the switchable power supply into an operation in the second line voltage range.

Preferably, the hole is arranged so that it is covered by an inserted plug unit. In this way if the plug unit is in place, one can prevent the switch from being manually actuated by a user, so as to circumvent the automatic selection of the line voltage range. Thus again, reliable operation of the plug type power supply unit is ensured.

In one embodiment, the first stage of the switchable power supply is set up to rectify an AC line voltage from the first line voltage range without voltage doubling if the switch is in an open state and to rectify line voltage from the second voltage range with voltage doubling when the switch is in a closed state. Preferably in this case the first line voltage range is higher than the second line voltage range. For example, the first line voltage range corresponds to an AC line voltage of 230 volts, while the second voltage range corresponds to an AC line voltage of 110 volts.

A rectifier in the first stage is designed, for example, so that if the switch is open, bridge rectification of the AC line voltage is carried out and the resulting DC voltage corresponds in amplitude essentially with the amplitude of the AC line voltage. In other words, voltage doubling does not take place in this case. Furthermore, the rectifier in the first stage is designed so that if the switch is closed, two one-way rectifications are carried out and the rectified voltages that result in each case are added. In other words, voltage doubling takes place in this case.

In various embodiments the receptacle of the plug type power supply unit is set up to hold the plug unit by means of a connection, for example a snap connection, a plug connection, a slide connection or a screw connection, at the housing. In this way unintentional separation of the plug unit from the housing of the plug type power supply unit can be avoided. Basically, however, the plug unit is separable from the housing.

In one embodiment in which actuation of the switch is not intended for the separable plug unit, the plug type power supply unit comprises an electronic detector circuit with which the amplitude of the AC line voltage is detected. In one embodiment the detector circuit is designed as a peak value detector circuit. The detector circuit activates, [in] dependence on the recognition of the second line voltage range, a connected control circuit, which in turn closes an electronically designed switch, especially a triac, in order to carry out a rectification with voltage doubling from the second line voltage range.

In one embodiment the plug type power supply unit comprises an interface that has at least one supply line for output of the at least one DC voltage and that has at least one signal line. In other words, via the interface it is possible to output not just one or more DC voltages generated from the rectified AC line voltage, but it is also possible to output and/or receive control signals.

For example, the plug type power supply unit comprises at least one input element whose status can be output via the at least one signal line. Preferably, such an input element is designed as a simple key or button, where a signal is sent via the at least one signal line indicating whether the key is or is not pressed.

Furthermore, the plug type power supply unit can comprise an indicator element that can be controlled via the at least one signal line. For example, the indicator element can be designed as a lamp or LED, where control of whether the lamp or LED should be on or off takes place via the signal line. Thus, for example, from an apparatus connected to the plug type power supply unit, it is possible to send status information to the plug type power supply unit, which is indicated via the indicator element.

In another embodiment, the plug type power supply unit comprises a microcontroller that is set up to connect to a bus system via the at least one signal line. Via the microcontroller it is possible, for example, to control other functions of the switchable power supply, for instance whether and which voltage is output as DC voltage. Also, the voltage amplitude of the DC voltage can be controlled in this way. If a number of such plug type power supply units are used, they can, if they are connected to the bus system, be selected via a central control.

In another embodiment the switchable power supply is set up to be controlled in a standby operating state, where the control takes place via the at least one signal line. For example, in the standby operating state, control of switching operations in the second stage is switched off, so that if the output DC voltage is not required, power loss as a consequence of unnecessary switching operations is minimized. Preferably, however, in this case the switchable power supply is in a state that enables a rapid change to a normal or power operating state.

In another embodiment example the plug type power supply unit comprises at least one sensor element whose state is output via the at least one signal line. For example, a temperature sensor can be provided in the plug type power supply unit that measures the operating temperature of the switchable power supply. The corresponding measurement result can be output in analog or digital form via the interface. Alternatively or in addition, it is possible to provide in the plug type power supply unit a voltage detection circuit that establishes whether the switchable power supply is provided with sufficient AC line voltage on the input side. The detection result can be output, for example, as a logic signal via the interface.

In another embodiment the plug type power supply unit comprises a port via which all of the lines of the inner face are brought out of the housing. This enables both the at least one DC voltage and also control and/or sensor signals to be brought out from the plug type power supply with low expense by connecting a single plug connector.

The plug type power supply unit is preferably set up to supply voltage to an electronic system that is suitable for adjusting an adjustable item of furniture and/or for control of a consumer built into an item of furniture. Through the simple design of the plug type power supply, energy supply for the electronic system for furniture can take place flexibly and with low expense.

BRIEF DESCRIPTION OF THE DRAWINGS

The invention is explained in more detail below in embodiment examples by means of the figures. Elements that have the same function or action have the same reference numbers in the drawings.

DETAILED DESCRIPTION OF ILLUSTRATIVE EMBODIMENTS

Figure 1:
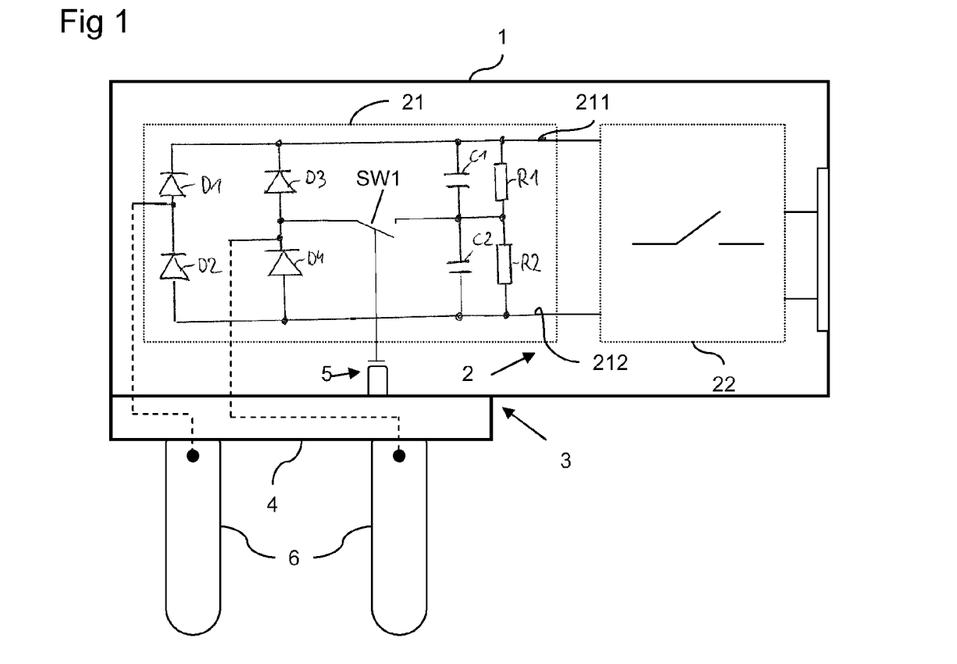
FIG. 1 shows a first embodiment example of a plug type power supply unit.

FIG. 1 shows an embodiment example of a plug type power supply unit with a housing 1 and a switchable power supply 2 arranged in housing 1. The switchable power supply 2 has a first stage 21 and a second stage 22. The first stage 21 is connected at the input side to prongs 6 for supply of AC line voltage and on the output side to the second stage 22 via connections 211 and 212. The outputs of the second stage 22 form a DC voltage output of the switchable power supply 2, or the plug type power supply unit. Prongs 6 are affixed in a plug unit 4, which is connected to the housing 1 of the plug type power supply unit via a receptacle 3.

The first stage 21 of the switchable power supply 2 has four rectifier diodes D1, D2, D3, and D4, which are connected analogous to a bridge rectifier. In particular, a series connection of the first and second diodes D1 and D2 as well as a series connection of the third and fourth diodes D3 and D4 is connected between connecting lines 211 and 212. Furthermore, a series connection of a first and a second capacitor C1 and C2 between connecting lines 211 and 212 is connected. A first resistor R1 is arranged parallel to the first capacitor C1. Similarly, a second resistor R2 is provided parallel to the second capacitor C2.

Additionally, the first stage 21 has an electromechanical or electronic switch SW1 that connects the junctions between the third and fourth diodes D3 and D4 with the junctions of the first and second capacitors C1 and C2 or the first and second resistors R1 and R2. Switch SW1 can be actuated, for example, mechanically or optically or otherwise, via actuating means 5, which can be triggered in dependence on the plug unit 4 that is furnished in each case. The switch SW1 is preferably designed as a microswitch.

Choke coils or other safety elements that are usually connected between a rectifier input and line voltage connections are not shown here, merely for the sake of clarity.

In the first stage 21, a first or a second mode of operation, or a first line voltage range or a second line voltage range, can be selected via switch SW1. For example, in the first mode of operation, switch SW1 is in an open position, so that there is no electrical connection between the junctions of capacitors C1 and C2 or resistors R1 and R2 and the junctions of diodes D3 and D4. In this case the circuit formed by the first stage operates as a bridge rectifier, with which the AC line voltage at the input side is converted as intermediate voltage to a DC voltage at connections 211 and 212.

Capacitors C1 and C2 in this case serve in the known way to store electrical energy and to smooth the intermediate voltage that is produced. To be able to distribute a voltage drop uniformly over capacitors C1 and C2, a potential equalization can take place via resistors R1 and R2, which circuit-wise corresponds approximately to a compensated capacitive voltage divider. Preferably, resistors R1 and R2 have the same or nearly the same resistance values. In addition, the capacitance values of capacitors C1 and C2 are also preferably nearly the same. The value of the output side intermediate voltage at connections 211 and 212 results in the known way from the voltage amplitude of the input side AC line voltage, which in Europe is roughly 400 volts.

In the second mode of operation switch SW1 is in a closed state. This can be brought about, for example, by using a plug unit 4 that triggers means 5 for actuation of switch SW1. In this case the connecting junctions of diodes D3 and D4 are electrically connected to the junctions of capacitors C1 and C2 and the junctions of resistors R1 and R2. This results in one-way rectification with each of diodes D1 and D2, in which rectification both the first and the second capacitors C1 and C2 become charged to the voltage amplitude of the AC line voltage at the input side. Diodes D3 and D4 are operated in reverse bias. Accordingly, approximately a doubling of the voltage amplitude at the input side takes place between connections 211 and 212 via capacitors C1 and C2. For example, if the effective AC line voltage at the input side is approximately 115 volts, each of the capacitors C1 and C2 will be charged to a voltage of about 200 volts. In this way an intermediate voltage of about 400 volts results as the resulting DC voltage between connections 211 and 212. This voltage then corresponds essentially to the output DC voltage or the intermediate voltage of the first stage in the first mode of operation, or in the first line voltage range if there is an effective input voltage of 230 volts. Thus, for various AC input voltages, an output DC voltage, or intermediate voltage of roughly the same magnitude can be made available at connections 211 and 212.

For the line voltage ranges of about 230 volts for the first line voltage range and about 110 volts for the second line voltage range, there are the relevant standardized plug types, which are unambiguously assigned to the relevant line voltage range. For example, in Germany plug type C, standard designation CEE 7/16 or CEE 7/17, and plug types E and F, standard designation CEE 7/7, are used for the first line voltage range of 230 volts. On the other hand, in North America plug types A, standard designation NEMA 1-15, or B, standard designation NEMA 5-15, are used for the second line voltage range of approximately 110 volts. Correspondingly, one plug unit 4, which has, for example, prongs 6 in accordance with plug type C, can be provided for the plug type power supply unit for use in Germany. In this case the plug unit 4 is designed so that switch SW1 is not actuated via actuation means 5 and thus voltage doubling does not take place in the rectification.

On the other hand, for use in North America a plug unit 4 with prongs 6 that corresponds to plug type A or B can be provided. In this case the plug unit 4 is designed so that switch SW1 is brought into a closed state via the actuation means 5 so as to produce rectification with voltage doubling in the first stage 21.

The intermediate voltage provided by the first stage 21 is converted to an output DC voltage in the second stage 22 in the switched-on state, indicated by the switch symbol of the second stage 22. In other embodiments the second stage 22 is set up to generate a number of DC voltages of different amplitude from the intermediate voltage, for example a first DC voltage and a second DC voltage, which are output at the output side.

Figure 2:
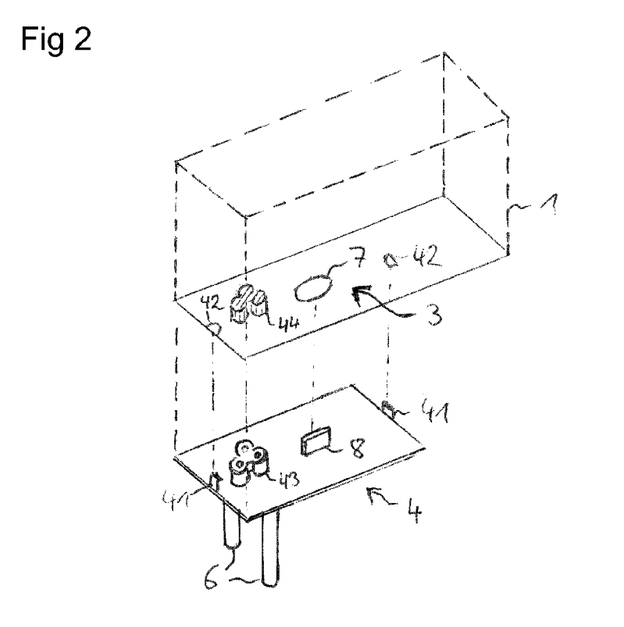
FIG. 2 shows a second embodiment example of a plug type power supply unit.

FIG. 2 shows another embodiment of a plug type power supply unit with a plug unit 4, which is accepted by receptacle 3 of housing 1. The switchable power supply 2 itself is not shown in FIG. 2 for reasons of clarity. Housing 1 has, on its underside, a receptacle 3 with recesses 42 for attachment of the plug unit 4, a plug socket 44 and a hole 7.

The plug unit 4 that is to be accommodated has prongs 6, connectors 41, a plug head 43 and a pin 8. In connections 41 and 42, which are designed as a snap connection, the plug unit can be affixed on housing 1. The plug head 43 has an electrical connection to prongs 6, which is not shown here. The plug head 43 can be designed as a cloverleaf plug in accordance with norm IEC-60320-05, which is also called a "Mickey Mouse plug" because of its shape. The plug socket 44 accordingly is set up to accommodate the plug head 43. Again an electrical connection between the plug socket 44 and the input of the first stage 21 is not shown here for clarity.

Pin 8 can be designed as a simple raised area on the plug unit, for example, as a peg or tower. Preferably, pin 8 is made of plastic, for example, together with the rest of plug unit 4 in an injection molding operation.

When the plug unit 4 is affixed on housing 1, the pin 8 enters the housing 1 through hole 7. Switch SW1 is thereby arranged over recess 7 in housing 1 so that it is mechanically actuated by pin 8 and thus is in a closed state. It goes without saying that in this case the prongs 6 correspond to a plug type that is intended for use with an AC line voltage of about 110 volts. However, if prongs 6 were intended to correspond to a plug type for an AC line voltage of about 230 volts, the plug unit 4 would not have the corresponding pin 8 so that switch SW1 would not be mechanically actuated and voltage doubling in the rectifier in the first stage 21 is not possible.

As shown in FIG. 2, the plug unit 4 is preferably designed so that the hole 7 in housing 1 is covered in any case when the plug unit 4 is inserted. In this way one can prevent a user of the plug type power supply unit, if the plug unit 4 is in place, from having the possibility of manually acting on switch SW1 and causing rectification with voltage doubling, even though it is not necessary or reliable for the line voltage range that is present. Through this, damage or destruction of the plug type power supply unit or the switchable power supply 2 can be avoided.

Alternatively, pin 8 and hole 7 can also be arranged in the region of the plug head 43 and plug socket 44, for example, as a pin directly on plug head 43. In this case the hole 7 is correspondingly arranged in plug socket 44, so that possible actuation of switch SW1 is possible only if a particular plug unit is attached. In addition, if one uses a traditional plug cable that could be inserted into the plug socket 44, actuation of switch SW1 is excluded.

Figure 3:
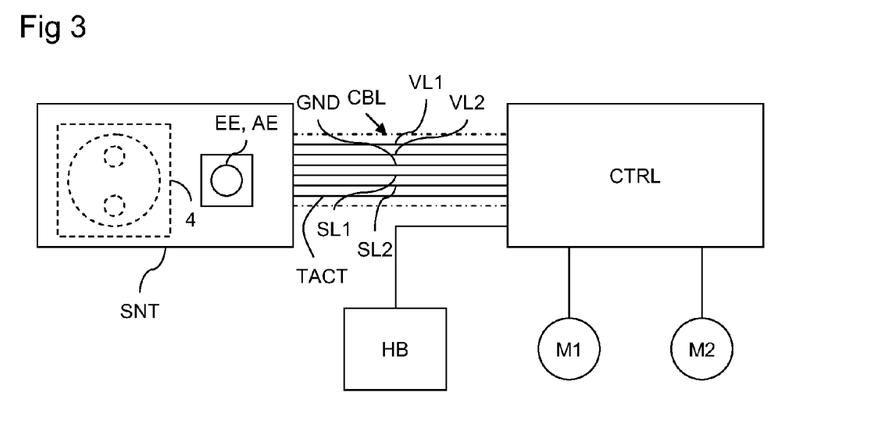
FIG. 3 shows an embodiment example of furniture control with a plug type power supply unit.

FIG. 3 shows a plug type power supply unit SNT, which is connected at the output side with a control CTRL for an electrically adjustable item of furniture. As an example, a first and a second motor M1 and M2 are connected to control CTRL. The motors can, for example, produce an adjustment of a height of a table or a bed. In addition, a manual operation unit HB via which a user of the control can perform an operation is connected to control CTRL.

The plug type power supply unit SNT, which can be designed, for example, like the embodiment forms in FIGS. 1 and 2, has a plug unit 4, which is shown as an example. In addition, there is an input element EE and an indicator element AE. The plug type power supply unit SNT is connected to control CTRL via a cable CBL, which has a first and a second supply line VL1 and VL2, a ground line GND, and a first and second signal line SL1 and SL2.

As noted above, a number of DC voltages can be generated via the second stage 22 of switchable power supply 2. For example, a first DC voltage can be output to the control via the first supply line VL1 and a second DC voltage can be output via the second supply line VL2. For example, the first DC voltage is used to supply the electronics of control CTRL, while the second DC voltage is used by control CTRL to operate motors M1 and M2. Logic and/or analog signals can be transmitted between the plug type power supply unit SNT and control CTRL via signal lines SL1 and SL2. Signal lines SL1 and SL2 thus can be used as serial and/or parallel data lines.

The input element EE is designed, for example, as a key whose state is transmitted to control CTRL via the first and/or second control line SL1 and SL2. Key EE can be used for various functions such as an emergency lowering of a bed if there is a loss of line voltage, in which only an emergency power supply is active, or for channel selection in the case of a control in which an operating device HB communicates with control CTRL via a selectable radio channel or infrared channel.

The indicator element AE in this embodiment example is designed as an illumination of key EE. The illumination can take place, for example, via an incandescent lamp or an LED. In one embodiment the emission of one or more LEDs is guided to the indicator element AE via a light guide. Whether or not the indicator element AE should or should not be lit is established via a control signal, which in turn is transmitted from control CTRL via the first and/or second signal lines SL1 and/or SL2.

In other embodiment examples the input element EE and the indicator element AE can also be provided separate from each other in the switchable power supply. Moreover, several independent input elements and several independent indicator elements can also be provided in the plug type power supply unit SNT.

Figure 4:
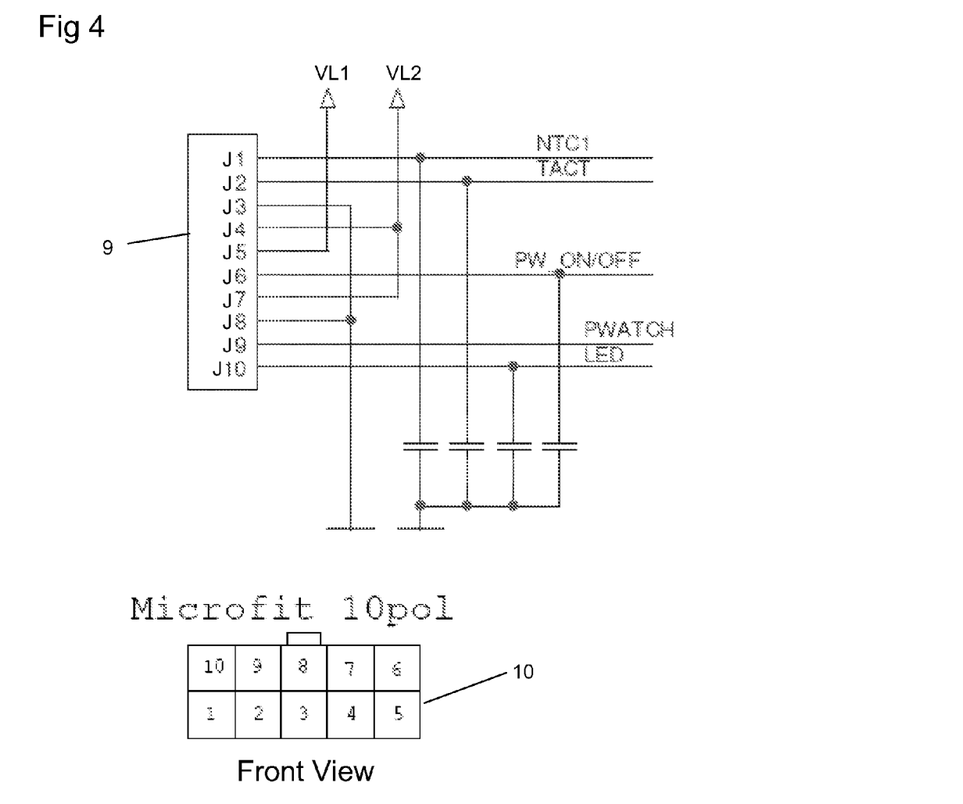
FIG. 4 shows an embodiment example of an interface of a plug type power supply unit.

FIG. 4 shows an embodiment example of an interface 9 of plug type power supply unit SNT. The interface 9 here has ten connections J1-J10, which are brought out of the plug type power supply unit SNT via the correspondingly numbered connections of a ten-pole connection socket 10.

Here connection J1 is connected to a signal line NTC1 and connection J2 to a signal line TACT. Furthermore, connections J3 and J8 are connected to a ground potential. The second supply line VL2 for output of the second DC voltage is connected to connections J4 and J7, while connection J5 is connected to the first supply line VL1 for output of the first DC voltage. Connection J6 is connected to a signal line PW_ON/OFF, while connection J9 is connected to a signal line PWATCH and connection J10 to a signal line LED. In addition, signal lines NTC1, TACT, PW_ON/OFF and LED are capacitively coupled to the ground connection for reasons of suppression.

The switchable power supply has, for example, a temperature sensor not shown here, the output signal of which is output to a connected control CTRL via the signal line NTC1 by plug type power supply unit SNT. A corresponding evaluation of the temperature information provided via signal line NTC1 thus alternatively takes place in the plug type power supply unit or in an external circuit.

Referring to FIG. 3, a logic state of the input element or key EE can be output externally via the signal line TACT. Similar to the temperature information, the logic state of the key is also preferably evaluated outside the switchable power supply or the plug type power supply unit.

The switchable power supply 2 can have a detection circuit, which monitors the presence of sufficient AC line voltage at the input of the first stage 21. For example, an LED of an optical coupler, whose emission is received on the reception side by a phototransistor, is turned on if the AC line voltage is present. Voltage supply for the receiver side phototransistor of the optical coupler can take place independent of the AC line voltage, for example, from a battery or an energy storage device charged in the operation of the switchable power supply. Thus, independent of the presence of a first or second DC voltage at the output of the switchable power supply, information about whether sufficient AC line voltage is available can be sent to an internal circuit via the signal line TACT, which is connected to the output of the said optical coupler.

Furthermore, a signal can be sent to the optical coupler via signal line PWATCH if there is an interruption or loss of AC line voltage. The PWATCH signal causes the operating parameters of the plug type power supply unit or the voltage supply of the electronic system to be stored, so that when normal operation is restored, the last operating state will be adopted.

An external control signal for control of indicator element AE can be supplied via the signal line LED.

Since only the connection of a plug at the connection socket 10 is necessary for the delivery or provision of the said signals and voltages, the installation expense in setting up a system as shown, for example, in FIG. 3 is low.

A signal that controls the switchable power supply in a standby operating state can be sent to the plug type power supply unit via control line PW_ON/OFF. One principle that is possible for realizing such a standby operating state is shown as an example in FIG. 5.

Figure 5:
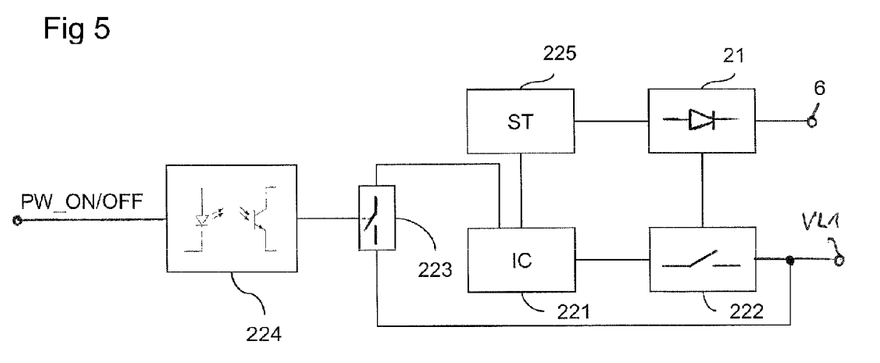
FIG. 5 shows an exemplary section of a block circuit diagram of a switchable power supply.

An optical coupler 224 that is connected on the input side to control line PW_ON/OFF and on the output side to a switching means 223, a switchable control unit 221, a switching means 222, a startup circuit 225 and the first stage 21 are shown in the block circuit diagram in FIG. 5. The startup circuit 225 is connected on the input side to the first stage 21, which, as described above, is electrically coupled to prongs 6 for supply of AC line voltage. Supply voltage of lower power for component 221 is made available via the startup circuit 225. Otherwise, component 221 is supplied via the first DC voltage at the first supply line VL1 or a voltage derived therefrom, where the supply can be connected or disconnected via switching means 223.

In regular operation, thus a normal or power operation, switching means 223 is closed, so that there is permanent supply to component 221. In this operating state, component 221 actuates switching means 222, so that, among other things, it generates the first DC voltage from the intermediate voltage provided by the first stage 21. Supply to component 221 by startup circuit 225 is not necessary in this mode of operation.

If the switchable power supply is to be controlled in a standby operating state by an appropriate signal on signal line PW_ON/OFF, switching means 223 is opened, so that component 221 is not permanently supplied. Actuation of switching means 222 in this operating state is possible only for a limited time period, since the energy made available by the startup circuit 225 is not sufficient for long-term switching operation of component 221. The corresponding is provided when the switchable power supply is triggered by a signal on signal line PWATCH to store the current operating parameters and to be controlled into the standby operating state.

In other words, component 221 operates in a cyclic operation in a standby operating state. This cyclic operation functions with the help of the startup circuit 225, which lets component 221 ramp up briefly and again stop after a short time, since supply to component 221 via the first DC voltage is not present. Component 221 thus is periodically initialized and again switched off.

In contrast to no-load in a performance operating state in which merely no power is being tapped via the first DC voltage, but nevertheless a power loss arises due to switching operations, at no load in a standby operating state the power takeoff of the circuit arrangement is clearly reduced, since the said switching losses do not arise. During the standby operating state, the plug type power supply unit does output voltage, which under some circumstances is also sufficient to power the electronics of a connected control, but not the performance unit. In other words, referring to FIG. 3, for example, a first DC voltage is output to supply the electronics of control CTRL, while the second DC voltage is not output for supply of motors M1 and M2 or is only output with insufficient power. In order to restore normal operation or performance operation, it is necessary that the switchable power supply 2 be again activated via control line PW_ON/OFF.

With the described standby operating state, the power demand of the switchable power supply can thus be reduced so that, for example, certain legal environmental standards, for example, "green label," can be met.

Figure 6:
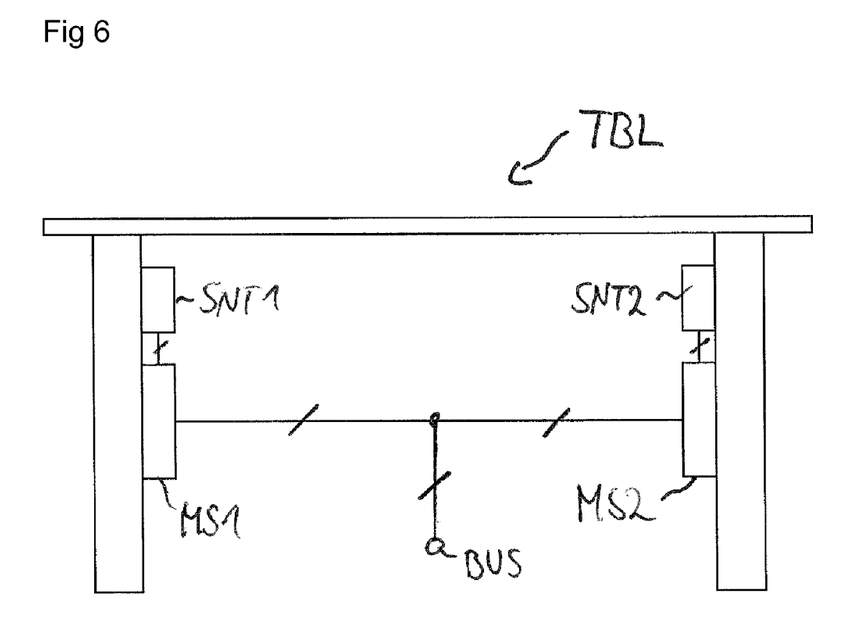
FIG. 6 shows an embodiment example of an electrically adjustable table.

FIG. 6 shows an embodiment example of an electrically height-adjustable table TBL, in which at each of the two table legs there is a motor control MS1, MS2 and plug type power supply units SNT1, SNT2, which correspond to the previously described embodiment example. Motor controls MS1 and MS2 in this case are connected to a bus system BUS. In addition, the first motor control MS1 is connected to a plug type power supply unit SNT1 and the second motor control MS2 is connected to plug type power supply unit SNT2. In particular, the connection of the plug type power supply units SNT1 and SNT2 to motor controls MS1 and MS2 also comprises a connection to bus system BUS, in addition to a voltage supply. If there are more than two table legs, one embodiment example comprises a motor control and a plug type power supply unit for each table leg. Of course, alternatively, an embodiment with just one central plug type power supply unit to supply all motor controls is envisioned.

The plug type power supply unit or units, SNT1 and SNT2 in accordance with FIG. 6, here have, for example, special microcontrollers, which can communicate with the connected motor controls via the BUS. Moreover, it is also possible for the plug type power supply units to communicate with the other apparatuses connected to the bus via the bus. For example, a not shown central control is connected to bus system BUS and sends control data to motor controls MS1 and MS2 and/or the plug type power supply units SNT1 and SNT2 via the bus BUS. For example, a control signal can be issued from such a central control to plug type power supply units SNT1 and SNT2 to connect them in the previously described standby operating state.

For communication via the bus system BUS, the microcontroller has, for example, a serial interface with corresponding sending and receiving lines.

The invention claimed is:

1. A plug type power supply unit with a housing and a switched power supply arranged in the housing, wherein:
   the switched power supply comprises a first stage that is set up for rectification of an AC line voltage, and a second stage that is set up to output a DC voltage generated from the rectified AC line voltage;
   the first stage has an electromechanical switch, via which a first line voltage range or a second line voltage range can be selected;
   the housing has a receptacle for a plug unit;
   the AC line voltage can be sent to the first stage via the plug unit when the plug unit is connected in the receptacle; and
   the receptacle has a hole that is suitable for receiving a pin of the plug unit when the plug unit is connected in the receptacle, wherein the switch is located such that it can only be actuated by the pin inside the housing, wherein the pin provides the second line voltage range but not the first line voltage range.

2. The plug type power supply unit as in claim 1, wherein the hole is arranged so that the hole is covered by the plug unit when the plug unit is connected in the receptacle.

3. The plug type power supply unit as in claim 1, wherein the first stage is set up to conduct the rectification of the AC line voltage from the first line voltage range without voltage doubling in an open state of the switch and to conduct the rectification of the AC line voltage from the second line voltage range with voltage doubling in a closed state of the switch.

4. The plug type power supply unit as in claim 3, wherein the first line voltage range is higher than the second line voltage range.

5. The plug type power supply unit as in claim 1, wherein the receptacle is set up to affix the plug unit on the housing by a connection.

6. The plug type power supply unit as in claim 1, further comprising an interface with at least one supply line for output of the DC voltage and with at least one signal line.

7. The plug type power supply unit as in claim 6, further comprising at least one input element, whose state can be output via the at least one signal line.

8. The plug type power supply unit as in claim 6, further comprising at least one indicator element that can be actuated via the at least one signal line.

9. The plug type power supply unit as in claim 6, further comprising a microcontroller that is set up to be connected to a bus system via the at least one signal line.

10. The plug type power supply unit as in claim 6, wherein the switched power supply is set up to be controlled in a standby operating state, wherein switching on takes place via the at least one signal line.

11. The plug type power supply unit as in claim 6, further comprising at least one sensor element, whose state can be output via the at least one signal line.

12. The plug type power supply unit as in claim 6, further comprising a connection socket, via which all of the lines of the interface can be brought out from the housing.

13. The plug type power supply unit as in claim 1, wherein in the power supply unit is set up to supply voltage to an electronic system that is suitable for adjustment of an adjustable item of furniture and/or for control of an unit built into an item of furniture.

14. A power supply unit comprising:
a housing;
a switched power supply arranged in the housing, wherein the switched power supply comprises a first stage that is set up for rectification of an AC line voltage and a second stage that is set up to output at least one DC voltage generated from the rectified AC line voltage, the first stage having an electromechanical switch configured to select a first line voltage range or a second line voltage range;
a receptacle disposed in the housing; and
a plug unit connected in the receptacle such that the AC line voltage can be sent to the first stage via the plug unit that is connected in each case, wherein the plug unit does not have a pin for the first line voltage range and does have such a pin for the second line voltage range, wherein the receptacle has a hole that is suitable for receiving the pin of the plug unit so that the switch is actuated by the attached pin inside the housing, and wherein the switch is located so that it can only be actuated inside the housing by the pin when the pin enters the housing through the hole.

15. The power supply unit as in claim 14, wherein the hole is covered by the plug unit.

16. The power supply unit as in claim 14, wherein the first stage set up to conduct the rectification of the AC line voltage from the first line voltage range without voltage doubling in an open state of the switch and to conduct the rectification of the AC line voltage from the second line voltage range with voltage doubling in a closed state of the switch.

17. The power supply unit as in claim 14, further comprising an interface with at least one supply line for output of the at least one DC voltage and with at least one signal line.

* * * * *

UNITED STATES PATENT AND TRADEMARK OFFICE
CERTIFICATE OF CORRECTION

PATENT NO. : 8,675,380 B2
APPLICATION NO. : 13/123474
DATED : March 18, 2014
INVENTOR(S) : Walter Koch It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 260 days.

Signed and Sealed this
Twenty-ninth Day of September, 2015

Michelle K. Lee
*Director of the United States Patent and Trademark Office*